(No Model.)
J. LAUDE.
SEED PLANTER AND FERTILIZER DISTRIBUTER.
No. 474,748. Patented May 10, 1892.
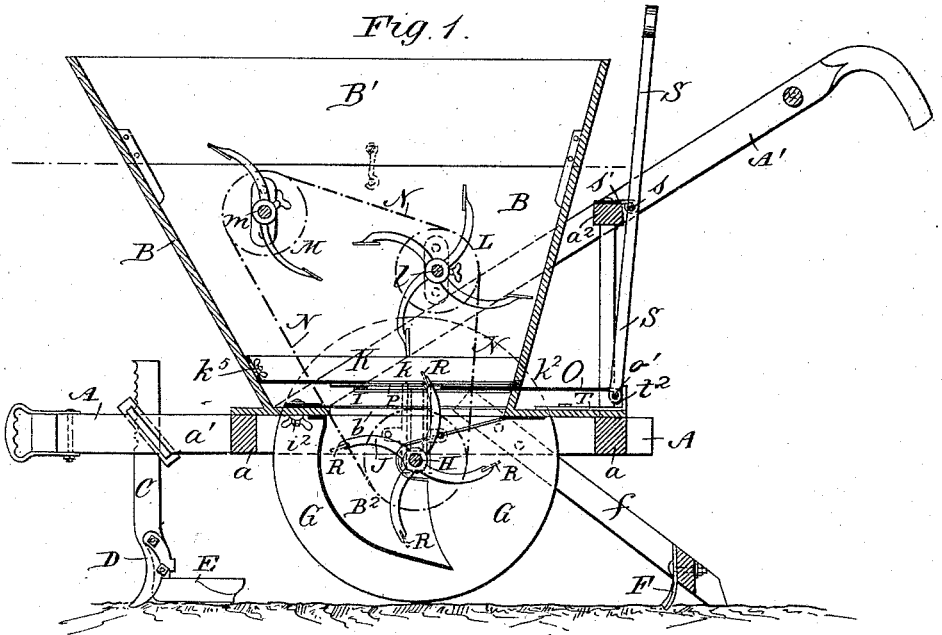
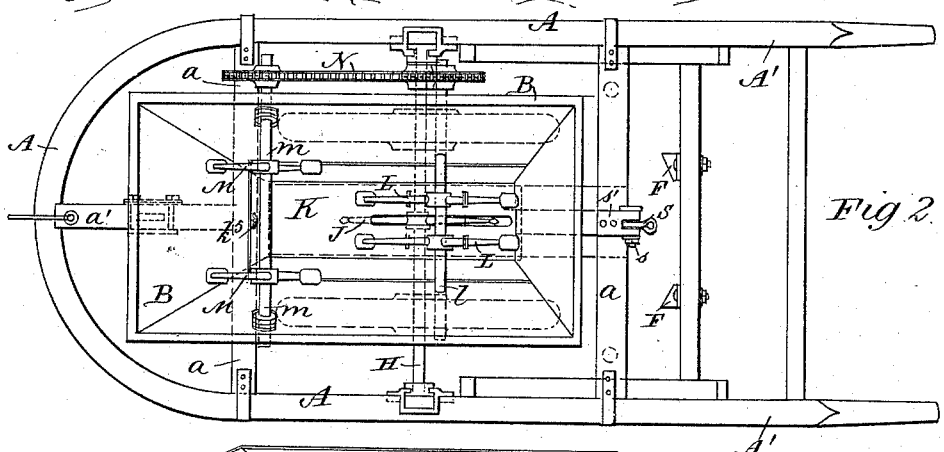
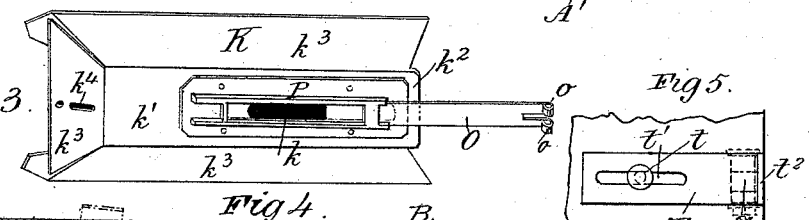
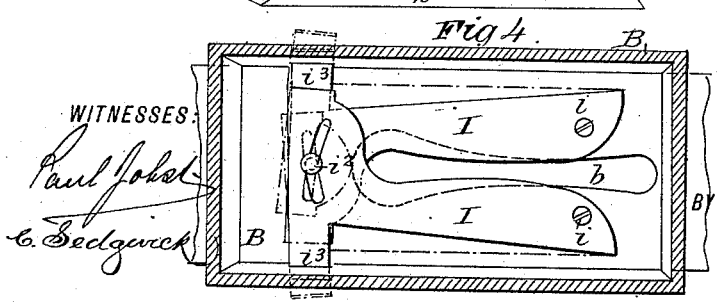
WITNESSES:
Paul Jobst
C. Sedgwick
INVENTOR:
J. Laude
Munn & Co.
ATTORNEYS.

UNITED STATES PATENT OFFICE.

JOSEPH LAUDE, OF MONTICELLO, ARKANSAS.

SEED-PLANTER AND FERTILIZER-DISTRIBUTER.

SPECIFICATION forming part of Letters Patent No. 474,748, dated May 10, 1892.

Application filed May 8, 1890. Serial No. 350,987. (No model.)

*To all whom it may concern:*

Be it known that I, JOSEPH LAUDE, of Monticello, in the county of Drew and State of Arkansas, have invented a new and Improved Seed-Planter and Fertilizer-Distributer, of which the following is a full, clear, and exact description.

My invention relates to a seed-planter and fertilizer-distributer, and has for its object to provide a simple, inexpensive, and efficient machine of this character.

The invention consists in certain novel features of construction and combinations of certain parts of the machine, all as hereinafter described and claimed.

Reference is to be had to the accompanying drawings, forming a part of this specification, in which similar letters of reference indicate corresponding parts in all the figures.

Figure 1 is a longitudinal vertical sectional view of my improved seed-planter and fertilizer-distributer as arranged for planting cotton-seed or for distributing a fine fertilizer. Fig. 2 is a plan view thereof. Fig. 3 is a top perspective view of the removable auxiliary bottom of the hopper. Fig. 4 is a plan view of the lower portion of the hopper and its outlet gages or valves, and Fig. 5 is a detail plan view of the seed-slide gage of the hopper.

The machine-frame A is made with a bowed front and side bars, formed preferably in one piece, and with suitable cross-bars $a$ $a$, on which the hopper B is sustained. A longitudinal part $a'$ of the frame supports the clipped standard C, which carries a furrow-opening plow D and a drag E, which smooths the furrow before the fertilizer or seed is dropped into it, and after the seed is dropped it is covered by plows F, fixed to a frame $f$, bolted to the main frame. The machine travels on two wheels G G, which are fixed to an axle H, which is preferably journaled at each end in vertically-adjustable bearings held in boxes bolted to the frame.

The hopper B has the usual downwardly-tapering form, and in Fig. 1 of the drawings is shown with a detachable upper section B', which is held in place by corner blocks or stays and hooks and will be applied when a coarse fertilizer—such as stable-manure—is to be distributed by the machine. The hopper is provided at its bottom with an outlet or opening $b$, near one end of which are pivoted at $i$ $i$ one end of two gage-plates I I, which at their free ends are provided with curved slots, through which a screw $i^2$ passes into the hopper-bottom to hold the plates at any required adjustment to allow feeding of the fertilizer only so fast as may be necessary. Lateral extensions $i^3$ $i^3$ of the gage-plates project through the side walls of the hopper and allow adjustment of the plates from the outside.

Onto the axle H is held by a spline or feather connection or by a set-screw or otherwise a feed-wheel J, the ends of the arms of which work through the hopper-outlet $b$ and between the opposing edges of the gage-plates I to draw coarse fertilizers from the hopper and downward into a chute $B^2$, fixed to the hopper-bottom, whence it falls to the ground. The feed-wheel also works through a slot $k$, made at the center of an auxiliary bottom K, which is placed in the hopper B a little above its bottom and the gages I, above described. Above the feed-wheel J and the auxiliary bottom when applied are journaled in and across the hopper two shafts $l$ $m$, onto each of which are placed two agitators comprising hubs and arms radiating therefrom and provided with fixed blades, which force the fertilizer or seed downward to the feed wheel as the agitators are rotated by a chain N, engaging a wheel on the axle H and wheels on the shafts $l$ $m$. The two agitators L L on the shaft $l$ are placed closer together than the other two agitators M M on the shaft $m$, as shown in Figs. 2 of the drawings.

I more particularly describe the auxiliary bottom K, with its gage O, as follows: Fig. 3 of the drawings shows that this bottom at the rear end of its base-plate $k'$ is provided with a tongue or tenon $k^2$ and also has front and two side flanges $k^3$ $k^3$ $k^3$, which are bent upward from the plate $k'$, but are not connected, thus leaving the flanges free to expand or contract to assure tight fit of them against the walls of the hopper, while allowing a set-screw $k^5$ to be passed through a slot $k^4$ in the front flange to hold the bottom higher or lower after its tenon $k^2$ shall have been entered into a slot or mortise made in the front end of the hopper to receive it. This auxiliary bottom as thus far described is substantially like the one described in another application for patent filed of even date herewith. The bottom K herein shown is also provided with a slide O, which is fitted into a suitable guide-frame P, fastened to the base-plate $k'$ of the auxiliary bottom. This frame P is provided with an opening fully as wide as the slot $k$ of the bottom K to allow the arms of the feed-wheel J to work through the slot $k$ to draw from the hopper any fine fertilizer or seed. The extremities of the arms of the feed-wheel are adapted to receive broader blades R, (shown in dotted lines in Fig. 1 of the drawings,) and which will be applied only when the auxiliary bottom K is not adjusted in the hopper. The outer end of the slide O is forked and is provided with eyes $o$ $o$ at its extremities, which receive a pin $o'$, which also passes through an eye at the lower end of a lever S, which is fulcrumed at $s$ to a plate $s'$, fixed to the rear top cross-bar $a^2$ of the frame A and extends upward within reach of the attendant, who will guide the machine by grasping its handles A' as it is drawn over the field.

To the bottom board of the hopper is held by a screw or bolt $t$ a gage-plate T, which has a slot $t'$, through which the fastening-screw passes to allow the gage to be set or adjusted, so that its upturned rear end or shoulder $t^2$ may be set nearer to or farther from the rear wall of the hopper to form a stop to the lower end of the slide O or its lever S to limit the pulling out of the slide by the lever at any desired point to make the discharge-outlet of the hopper at the slot $k$ larger or smaller, as the nature of the fine fertilizer or seed being drawn from the hopper by the feed-wheel J may require.

The operation of the machine may be briefly described as follows: To drop any coarse fertilizer, the upper section B' will be applied to the hopper to increase its capacity, and the auxiliary bottom K will be removed from the hopper, and the broad blades R will be attached to the arms of the feed-wheel, and when the hopper is filled and the gage-plates I I are adjusted and the machine is drawn forward the feed-wheel J will carry the fertilizer through the hopper-slot $b$ to the ground, while the agitators L M constantly loosen the fertilizer and force it downward toward the feed-wheel. For distributing a fine fertilizer the auxiliary bottom K will be adjusted in the hopper and the blades R will be removed from the feed-wheel to allow the extremities of its arms to work through the comparatively narrow slot $k$ of the auxiliary bottom, and when the top B' of the hopper is removed and the hopper is charged with the fertilizer, and the dropping slide O is adjusted properly by the lever S, and the gage T is set behind the slide and lever O S to maintain this adjustment of the slide, and the draft is applied to the machine the feed-wheel will draw the fertilizer from the hopper and drop it to the ground and the agitators L M will stir up and loosen the fertilizer to maintain a supply to the feed-wheel. For planting cotton it is only necessary for the operator to draw out the fulcrum-pin $s$ of the lever S and lower the lever and draw out the slide O by pulling back the lever, and the machine is ready for work. However, the machine may be used to drop fertilizer or seed, as above described. The fertilizer or seed will fall into a furrow opened by the plow D and will be covered by the plows F, as will readily be understood.

Some of the features hereinbefore described I have claimed in a companion application filed on May 13, 1890, Serial No. 351,691.

Having thus described my invention, what I claim as new, and desire to secure by Letters Patent, is—

In a seed-planter and fertilizer-distributer, the combination, with the frame, hopper, axle, wheels, and a feed-wheel, of a detachable auxiliary bottom fitted in the hopper and provided with a slot through which the feed-wheel is adapted to operate, an adjustable dropping slide fitted to the auxiliary bottom at its slot, a lever fulcrumed to the frame or hopper and connected to the dropping slide, and an adjustable gage held to the hopper or frame and provided with a flange or projection extending behind the slide and lever, substantially as herein set forth.

JOSEPH LAUDE.

Witnesses:
SIG KUHN,
W. J. HANUM.